United States Patent

Willcox

[15] 3,656,921

[45] Apr. 18, 1972

[54] COATING GLASS PARTICLES WITH AN OXYGEN-CONTAINING COMPOUND TO PREVENT STICKING DURING HEATING

[72] Inventor: Oswin Burr Willcox, Landenburg, Pa.

[73] Assignee: E. I. du Pont de Nemours and Company, Wilmington, Del.

[22] Filed: June 2, 1970

[21] Appl. No.: 42,856

[52] U.S. Cl.............................65/21, 65/33, 65/60, 106/300, 106/308 B, 117/33, 117/70 A, 117/72, 117/81, 117/100 S, 117/126 GI, 117/161 UE, 117/161 UC, 117/161 UB, 117/164
[51] Int. Cl.................C03b 19/10, C03b 29/00, C09c 1/36
[58] Field of Search............117/100 S, DIG. 6, 126 GI, 117/33, 70 A, 16; 65/60, 33, 21; 106/308 B, 300

[56] References Cited

UNITED STATES PATENTS

| | | | |
|---|---|---|---|
| 3,342,617 | 9/1967 | Jackson | 117/100 X |
| 3,250,603 | 5/1966 | Schott | 65/60 X |
| 3,002,857 | 10/1961 | Stalego | 117/126 |
| 3,050,409 | 8/1962 | Bayer | 117/126 X |
| 2,444,347 | 6/1948 | Greger | 117/126 |
| 3,004,875 | 10/1961 | Lytle | 65/60 X |
| 3,232,788 | 2/1966 | Marzocchi et al. | 117/126 |
| 3,459,574 | 8/1969 | Willox et al. | 117/126 X |

FOREIGN PATENTS OR APPLICATIONS 247,091  5/1963  Australia ........................117/126

Primary Examiner—William D. Martin
Assistant Examiner—Mathew R. P. Perrone, Jr.
Attorney—Louis Del Vecchio

[57] ABSTRACT

Glass particles are prevented from sticking to each other or to processing equipment when heated up to about the sintering temperature of the glass by maintaining on the surface of the glass particles at least a partial coating of at least one oxygen-containing compound having a melting point higher than that of the glass particles and present in the amount of at least 1 weight percent based on the weight of the glass particles.

3 Claims, No Drawings

COATING GLASS PARTICLES WITH AN OXYGEN-CONTAINING COMPOUND TO PREVENT STICKING DURING HEATING

BACKGROUND OF THE INVENTION

This invention relates to a method of preventing glass particles from sticking together when heated to a temperature of at least about the melting point of the glass thereby maintaining free flow characteristics of the heated glass particles. More particularly, this invention relates to a method for preparing glass particles as opacifying pigments. The opacifying pigments are useful in paints, enamels, and similar protective coatings, papers, films, plastics, elastomers and textile fibers.

It is known that glass particles each encapsulating an opacifying agent such as titanium dioxide or zirconium dioxide are useful as opacifying pigments. U.S. Pat. No. 3,459,574 discloses a process for preparing these opacifying pigments by (a) preparing a molten homogeneous glass composition containing the desired amount of opacifying agent, (b) quenching the homogeneous glass composition in cold water and grinding to form clear glass frit, (c) heating the frit to about the sintering temperature of the glass to nucleate and recrystallize the opacifying agent within the particles of glass, and (d) cooling the frit. The opacifying agent in the frit precipitates as crystals within the frit and increases in size with increased time and temperature. The size of the crystals aids in determining the degree of opacity achieved.

The process step (c), of heating the clear glass frit to develop opacity, involves heating the glass frit to a temperature of about the sintering temperature of the glass. As a result, a problem develops, namely that the glass frit becomes sticky, agglomerates, and sticks to the walls of the container or other processing equipment in contact with the glass frit. Upon cooling, the frit forms one mass of glass instead of the desired particulate glass particles. This mass of glass must then be broken up by mechanical methods such as crushing and grinding to produce the proper particle size for its end use.

There is a need, therefore, for a method of heating glass particles to a temperature of about the sintering temperature of the glass without having the glass particles adhere to each other or to the processing equipment.

SUMMARY OF THE INVENTION

Accordingly, this invention provides a process of heating glass particles to a temperature of about the sintering temperature of the glass while preventing the glass particles from sticking to each other or to the processing equipment by maintaining on the surface of the glass particles at least a partial coating of at least one oxygen-containing compound having a melting point higher than that of the glass particles and present in the amount of at least 1 weight percent based on the weight of the glass particles.

DETAILS OF THE INVENTION

In the preferred embodiment of this invention, clear porcelain enamel frit is heated to about the sintering temperature of the glass to nucleate and recrystallize the dissolved titanium dioxide and render the glass particle opaque. The frit at room temperature is coated by dry dusting the frit with titania. The coated frit is then heated to a temperature of about the sintering temperature of the glass frit. Heating can be accomplished in a rotating kiln, in a fluidized bed or in other known conventional devices. Upon heating the frit, it has been found that with the frit coated, it does not agglomerate into a mass but remains as separate discrete particles; however, without the coating, it agglomerates and sticks to the processing equipment.

When the heating step is completed, any excess coating material, that is the material which did not adhere to the glass, can be removed by elutriation, if desired. The amount of excess coating material is generally so small that its removal is not necessary or desirable.

The resulting product of this preferred embodiment is an opacifying pigment useful in making paints and other products where conventional pigments can be used.

The particle size of the glass useful in this invention is usually dictated by the final application for which the product is intended. In preparing opacifying pigments for use in products such as paint, the particle size of the glass can be within the range of about 0.03 inch to 0.25 inch in diameter.

The coating composition is characterized as comprising at least one oxygen-containing compound having a melting point higher than that of the glass being processed. Alternatively, the coating composition need not have a melting point higher than that of the glass, but must be capable of forming with the alkali diffusing from the heated glass particles, a compound that has a melting point higher than that of the glass.

Useful coating compounds include clay, titania, alumina, silica, zirconia, magnesia, calcia, calcium carbonate, calcium sulfate, barium sulfate and aluminum phosphate.

The coating composition can be finely divided for use ranging in particle sizes from about 0.1 to 10 microns.

The amount of coating used to prevent sticking of the glass particles is variably dependent on such factors as the particular coating composition to be used, the size and number of glass particles to be coated and the conditions under which the glass particles are to be heated. It has been found that sticking and agglomeration of the glass particles are prevented even when the glass particles are only partially coated. Positive results are obtained when the amount of the coating composition is at least 1 weight percent based on the weight of the glass particles. Preferably the coating composition is present in the amount of 3 to 15 weight percent based on the weight of the glass particles to obtain optimum results. Amounts above 15 weight percent can be used but they are generally wasteful. The amount required can be empirically determined by one skilled in the art. As an example, 0.5 gram of 5 micron particle size silica coated on 10 grams of porcelain enamel frit ranging in size from about 0.04 inch to 0.05 inch in diameter was sufficient to prevent sticking of the glass particles when heated.

The coating composition can be applied to the glass particles incrementally or continuously prior to the heating step or during the early part of the heating step but before the temperature reaches the sintering temperature of the glass. As used herein, the sintering temperature means that temperature sufficient to cause glass particles to become a coherent non-porous mass without melting. Various methods can be employed to apply the coating composition. One method is by dusting the glass particles with the coating composition. This can be accomplished while the glass particles are either wet or dry, or while the coating composition is either damp or dry. Wet-coated particles can be dried by a separate drying step or during the first part of the glass heating step.

If desired, the glass particles can first be coated with a film-forming organic binder prior to the step of applying the coating composition. The organic binder assists in effecting adhesion between the glass particles and the coating composition. Representative film-forming binders include: a protein colloid, water-soluble vinyl alcohol, water-soluble acrylic resins, and carboxy vinyl polymers.

The process of this invention provides the advantages of (a) preventing glass particles from sticking together and to the process equipment when the glass is heated to a temperature of about the sintering temperature of the glass, (b) maintaining the free flow characteristics of the glass particles at elevated temperatures, and (c) improving the heat distribution characteristics resulting from heating individually coated glass particles rather than a solid mass of agglomerated glass. In the case where the glass particles are frit, the improved heat distribution allows for better temperature control resulting in the improved growth of the crystals of opacifying agent rendering a more uniform opaque appearance.

Although this invention has been described in the context of heating glass particles as a frit to precipitate an opacifying pigment, the method of this invention is applicable to any situation where glass particles are heated to about the sintering temperature of the glass and it is desirable to avoid sintering.

The following examples illustrate this invention. All parts, percentages and proportions are by weight unless otherwise indicated. The examples illustrate the results obtained employing the process of this invention. For comparison, each example carried out without the use of the coating composition of this invention results in the glass particles sticking to each other and to the process equipment.

EXAMPLE 1

Fifteen grams of porcelain enamel frit containing approximately 21 percent dissolved titanium dioxide are screened to obtain a frit having a particle size of 0.04 inch to 0.05 inch. The glass particles are shaken with 6 grams of a clay identified as "Satintone Special Clay", obtained from Minerals and Chemical Philipp Corp. Menlo Park, New Jersey. The average particle of this clay is about 1 micron in diameter and is in the form of a thin hexagonal plate of possibly 0.2 micron in thickness or less. By analysis, this clay includes 52.3% $SiO_2$, 44.6% $Al_2O_3$, and shows an ignition loss of 0.5 percent by weight. The clay coated the glass very well with some loose clay being lodged in the interstices of the glass particles. 11½ grams of clay-coated glass frit product is tamped lightly into a gold-foil-lined high-alumina clay capsule of 4 centimeters diameter. The crucible is heated in a muffle furnace at 800° C., for 40 minutes, the furnace is cooled and the crucible is removed from the furnace.

The clay-coated glass retains its particulate form, and mere inversion of the crucible is all that is necessary to allow the contents to flow out. The clay-coated particles are stirred in water and the nonadherent clay removed. The particles are then acetone-washed to remove the water and dried. Microscopic examination shows that the particles are of the original size, but free from occlusions and more rounded than the particles of unheated frit. The weight of the particles recovered is 8.5 grams compared with 8.2 grams used. Therefore, the product after heating, washing and drying has 0.3 gram of 3.5 percent clay present. Most of the clay, however, is very loosely bound to the particles and is easily removed by lightly rubbing the treated particles.

EXAMPLE 2

One hundred grams of enamel frit such as that used in Example 1 is ground and screened through sieves of size −8 +14 mesh (U.S. Standard Sieve Series). Ten grams of the ground glass frit are treated with 5 percent (based on the weight of the glass particles) of silica having an average particle size of 5 microns, commercially available as "Minusil" from Whitaker, Clark and Daniels, New York, New York. To obtain a covering of the glass particles with the fine particle size silica, the glass particles are dampened with water, the silica added, and the mixture stirred. The coated frit product is charged to a porcelain-lined evaporating dish, and heated to a temperature of 750° C. for 30 minutes.

The evaporating dish is removed from the furnace and cooled. The frit does not stick to the porcelain evaporating dish, is observed to be lightly sintered, and is easily broken up into particulate form by finger crushing.

EXAMPLE 3

Enamel frit such as that used in Example 1 is ground to obtain a portion within the particle size range of −40 + 100 mesh (U.S. Standard Sieve Series). Ten grams of the ground and sized particles are mixed in a dry condition with 7.5 percent (based on the weight of the glass particles) of a pigmentary titania thereby coating the glass particles with titania. The coated frit is heated in a porcelain-lined evaporating dish to a temperature of 705° C. for 15 minutes in a muffle furnace.

The frit is cooled and upon examination is found to be lightly sintered, but nonadherent to the evaporating dish. It is easily crushed in a mortar to recover the glass pigment in its original grain size.

The sample is washed. During the washing 0.2 gram of titania is recovered. Thus, 0.55 weight percent titania remained on the particles. The titania adhering to the surface of the glass particles provides increased hiding power and whiteness to the pigment.

EXAMPLE 4

Glass frit containing 25.54 weight percent titanium dioxide is ground and screened through a −40 +80 mesh sieve (U.S. Standard Sieve). Five hundred and eighty grams of the screened frit and 8 percent by weight of the glass particles of the same clay used in Example 1 are charged to a 6-inch diameter spherical fused quartz calcining flask. The flask is rotated in a kiln and heated from room temperature to 765° C. over a period of 45 minutes. When the temperature reaches 752° C., 2 grams of clay, in addition to the original 8 percent (46.4 grams) are charged to the flask. When the temperature reaches 750° C., 2 additional grams of clay are added. The temperature is maintained at 765° C. for 5 minutes and then the sample is cooled.

The frit does not stick to the flask wall, it has generally maintained its particulate form and any clusters of glass which form are easily broken up into discrete particles.

The sample is wet ground to give a size fraction of one to 44 microns and is used in the preparation of a paint according to the process described in U.S. Pat. No. 3,459,574.

EXAMPLE 5

Glass frit such as that used in Example 1 is ground and screened through a −20 +40 sieve (U.S. Standard Sieve). Ten grams of the screened frit are mixed with 1 cubic centimeter of water and ½ cubic centimeter of commercially available "Alkophos C", available from Monsanto Chemical Company. "Alkophos C" comprises 8.6% $Al_2O_3$ and 32.6% $P_2O_5$. The dampened glass particles are dried in a glass evaporating dish at 130° C.

The sample is then placed in a muffle furnace at 675° C. for 15 minutes. The temperature is then raised to 690° C. for 15 minutes; then the temperature is increased to 720° C. for 10 minutes.

The frit is lightly sintered, easily flows from the dish and any clusters that form are easily broken up with slight crushing.

EXAMPLE 6

This example illustrates the use of an organic binder in conjunction with the coating material and the glass frit to be treated.

Frit product such as that used in Example 1 is ground and screened through a −40 +20 mesh sieve (U.S. Standard Sieve). An aqueous slurry of 10 weight percent protein colloid (Swift Company) is prepared and to this dispersion is added 2 grams of titania. This slurry is mixed and added to 50 grams of glass frit product. The mixture of frit product and slurry is thoroughly mixed. The treated glass frit is placed in a glass-lined evaporating dish and stirred under a stream of air until the glass particles are separate and dry. The evaporating dish and contents are then placed in a muffle furnace and heated to a temperature of 700° C. for 15 minutes. After heating, the evaporating dish and contents are cooled and the frit is found to be free-flowing and easily poured from the dish. There is no sticking of the frit to the walls of the evaporating dish.

I claim:

1. In a process wherein particles of glass frit containing titanium dioxide are heated to about the sintering temperature of the glass and cooled to thereby nucleate and recrystalize the titanium dioxide to render the particles opaque and suitable for pigmentary purposes, the improvement, for prevention of sticking and agglomeration, which comprises maintaining on the particles during said heating at least a partial coating of titania, the amount thereof being about 3 to 15 weight percent based on the weight of the glass frit particles.

2. The process of claim 1 in which the glass frit particles are coated with a film-forming organic binder either prior to or simultaneously with application of the titania coating.

3. The process of claim 1 in which the particle size of the glass frit is about 0.03 inch to 0.25 inch and the particle size of the titania coating is about 0.05 to 5 microns.

* * * * *